US011619265B2

(12) United States Patent
Message et al.

(10) Patent No.: US 11,619,265 B2
(45) Date of Patent: Apr. 4, 2023

(54) METHOD FOR MANUFACTURING A TARGET HOLDER FOR A SENSOR BEARING UNIT, AND ASSOCIATED SENSOR BEARING UNIT

(71) Applicant: Aktiebolaget SKF, Gothenburg (SE)

(72) Inventors: Olivier Message, Saint-Cyr-sur-Loire (FR); Eric Robert, Saint Cyr sur Loire (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/555,562

(22) Filed: Dec. 20, 2021

(65) Prior Publication Data
US 2022/0196071 A1 Jun. 23, 2022

(30) Foreign Application Priority Data
Dec. 22, 2020 (DE) .......................... 102020134719.7

(51) Int. Cl.
*F16C 19/06* (2006.01)
*F16C 33/64* (2006.01)
*F16C 41/00* (2006.01)
*F16C 33/58* (2006.01)

(52) U.S. Cl.
CPC .............. *F16C 33/64* (2013.01); *F16C 19/06* (2013.01); *F16C 33/581* (2013.01); *F16C 33/586* (2013.01); *F16C 41/007* (2013.01); *F16C 2220/48* (2013.01); *F16C 2223/06* (2013.01); *F16C 2223/08* (2013.01); *F16C 2233/00* (2013.01)

(58) Field of Classification Search
CPC ...... F16C 19/06; F16C 33/581; F16C 33/586; F16C 33/64; F16C 41/007; F16C 2233/00; F16C 2220/48; F16C 2223/06; F16C 2223/08; F16C 2226/12

See application file for complete search history.

(56) References Cited

U.S. PATENT DOCUMENTS

| 6,814,685 | B2 * | 11/2004 | Hirai | F16H 15/38 |
| | | | | 384/492 |
| 7,485,194 | B2 | 2/2009 | Mega et al. | |
| 9,322,074 | B2 * | 4/2016 | Gegner | F16C 33/64 |
| 9,494,196 | B2 * | 11/2016 | Sausset | G01P 3/443 |
| 10,132,359 | B2 | 11/2018 | Chaussat et al. | |
| 2014/0270616 | A1 * | 9/2014 | Umemoto | F16C 19/364 |
| | | | | 384/569 |
| 2019/0301528 | A1 * | 10/2019 | Koike | F16C 33/121 |

FOREIGN PATENT DOCUMENTS

FR 2884367 B1 9/2007
WO 2014/006436 A1 1/2014

OTHER PUBLICATIONS

Machine Translation of FR 2884367 A 1 (Year: 2007).

* cited by examiner

*Primary Examiner* — Phillip A Johnson
(74) *Attorney, Agent, or Firm* — Garcia-Zamor Intellectual Property Law, LLC; Ruy Garcia-Zamor

(57) ABSTRACT

A method for manufacturing of a target holder 26 for a sensor bearing unit. The target holder providing at least an axial fixing portion secured to a ring of the sensor bearing unit, and a radial portion extending at least radially with respect to the axial fixing portion, a curved linking portion being formed between the axial fixing portion and the radial portion. The method further providing a step of shot peening at least on the internal surface of the curved linking portion of the target holder.

10 Claims, 5 Drawing Sheets

METHOD FOR MANUFACTURING A TARGET HOLDER FOR A SENSOR BEARING UNIT, AND ASSOCIATED SENSOR BEARING UNIT

CROSS-REFERENCE TO RELATED APPLICATIONS

This application claims priority to German Patent Application no. 102020134719.7, filed Dec. 22, 2020, the contents of which is fully incorporated herein by reference.

FIELD OF THE INVENTION

The present invention relates to a method for manufacturing a target holder for a sensor bearing unit. The present invention also relates to a sensor bearing unit comprising a bearing and an impulse ring.

BACKGROUND OF THE INVENTION

Today, sensor bearing units are commonly used in a wide range of technical fields, for example in automotive industry and aeronautics. These units provide high quality signals and transmissions, while allowing integration in simpler and more compact apparatus.

Such a sensor bearing unit generally comprises a bearing, an impulse ring, and detection means facing the impulse ring. For example, the impulse ring is provided with a target holder and with a magnetized target fixed to the target holder beyond the outer ring of the bearing.

The magnetic target includes alternating North and South poles, whose number depends on bearing size, detection precision and particular application. The detection means may be fixed to the outer ring of the bearing or to a fixed casing.

In a first type of impulse ring, the target holder comprises a flange provided with an outer tubular portion onto which the magnetic target is attached, and with an inner tubular portion secured into an annular groove made in the bore of the inner ring in order to prevent the rotation of the impulse ring relative to the inner ring.

In a second type of impulse ring, the target holder of the impulse ring is further provided with a fixing sleeve supporting the flange and secured to the inner ring. The sleeve comprises an annular axial portion secured into the annular groove of the inner ring and a radial collar extending radially outwards the axial portion, the flange being axially mounted between the inner ring of the bearing and the radial collar of the sleeve. For more details, it is possible for example to refer to the U.S. Pat. No. 10,132,359.

In some cases, due to heavy vibrations conditions, there is a significant risk that cracks appear on the flange or sleeve secured to the inner ring. This reduces the fatigue life of the sensor bearing unit in such conditions.

One aim of the present invention is to overcome this drawback.

SUMMARY OF THE INVENTION

The invention relates to a method for manufacturing a target holder for a sensor bearing unit, the target holder comprising at least an axial fixing portion intended to be secured to a ring of the sensor bearing unit, and a radial portion extending at least radially with respect to the axial fixing portion, a curved linking portion being formed between the axial fixing portion and the radial portion.

The method comprises a step of shot peening at least on the internal surface of the curved linking portion of the target holder.

The terms "internal surface of the curved linking portion" of the target holder is understood to mean the surface intended to face the ring of the sensor bearing unit, or intended to be oriented axially towards the ring.

The terms "radial portion" of the target holder is understood to mean a portion which extends at least radially. For example, such portion may extend purely radially. Alternatively, such portion may extend obliquely, i.e. both radially and axially. In another variant, such portion may comprise radial part(s) and frustoconical part(s).

The area shot peened enables to create compressive residual stresses and therefore compensates the tensile stresses created when the axial fixing portion of the target holder is fitted on the associated ring of the sensor bearing unit.

This improves the fatigue life of the target holder in heavy vibrations conditions. As a matter of fact, the applicant has determined that the internal surface of the curved linking portion of the target holder, which is formed between the axial fixing portion and the radial portion, is the most strained area. Besides, this improves the fatigue life of the target holder without changing its geometry.

As previously mentioned, according to a general feature, the area shot peened is at least the internal surface of the curved linking portion of the target holder.

The area shot peened may also include the adjacent region of internal surface of the curved linking portion located on the axial fixing portion and the radial portion of the target holder.

Alternatively, or in combination, the area shot peened may include the external surface of the curved linking portion of the target holder. The area shot peened may also include the adjacent region of the external surface of the curved linking portion located on the axial fixing portion and the radial portion of the target holder.

In one specific embodiment, the step of shot peening may be carried out on the whole target holder.

Advantageously, the method further comprises a step of polishing and/or brushing at least the internal surface of the curved linking portion of the target holder.

This further improves the fatigue life of the target holder in heavy vibrations conditions since the crack resistance of the curved linking portion of the target holder is enhanced.

The step of polishing and/or brushing may also be carried out on the adjacent region of internal surface of the curved linking portion located on the axial fixing portion and the radial portion of the target holder.

Alternatively, or in combination, the step of polishing and/or brushing may be carried on the external surface of the curved linking portion of the target holder. The step of polishing and/or brushing may also be carried out on the adjacent region of the external surface of the curved linking portion located on the axial fixing portion and the radial portion of the target holder.

In one specific embodiment, the step of polishing and/or brushing may be carried out on the whole target holder.

Preferably, the step of polishing and/or brushing is carried out after the step of shot peening. Alternatively, it could be possible to foresee the step of polishing and/or brushing before the step of shot peening.

The method may further comprise, before the step of shot peening, the step of forming the target holder from a metal sheet, notably by drawing.

In this case, the method may further comprise, before the step of forming the target holder, the step of manufacturing the metal sheet which includes a final skin-pass operation. The skin-pass operation is the last step of the manufacturing of the metal sheet. During this step, the roughness of the metal sheet is reduced.

The reduced roughness of the metal sheet prevents the initiation of cracks during drawing of the axial fixing portion of the target holder at forming step. This further improve the cracks resistance of the target holder.

The invention also relates to a method for manufacturing a sensor bearing unit comprising a bearing comprising a first ring and a second ring capable of rotating concentrically relative to one another, and an impulse ring provided with a target holder secured to the first ring and with a target mounted on the target holder.

The method comprises the following steps: manufacturing the target holder as previously defined and securing the target holder to the first ring.

The invention also relates to a sensor bearing unit comprising a bearing comprising a first ring and a second ring centered on an axis, and an impulse ring provided with a target holder manufactured according to the method as previously defined, and with a target mounted on the target holder.

The invention further relates to a sensor bearing unit comprising a bearing comprising a first ring and a second ring centered on an axis, and an impulse ring provided with a target holder and with a target mounted on the target holder.

According to a general feature, the target holder comprises at least an axial fixing portion secured to the first ring, and a radial portion extending at least radially with respect to the axial fixing portion, a curved linking portion being formed between the axial fixing portion and the radial portion of the target holder.

According to another general feature, at least the internal surface of the curved linking portion of the target holder is provided with a plurality of dimples.

The dimples are formed by a shot peening operation.

In one embodiment, the target holder of the impulse ring comprises at least a flange onto which is mounted the target. The flange comprises an axial portion forming the axial fixing portion of the target holder.

In another embodiment, the target holder of the impulse ring comprises at least a flange onto which is mounted the target and a sleeve. The sleeve comprises an axial portion forming the axial fixing portion of the target holder. The flange is axially mounted between a lateral face of the inner ring and the sleeve and is radially mounted around the sleeve.

BRIEF DESCRIPTION OF THE FIGURES

The present invention and its advantages will be better understood by studying the detailed description of specific embodiments given by way of a non-limiting examples and illustrated by the appended drawings on which.

DETAILED DESCRIPTION OF THE INVENTION

Figure 1:
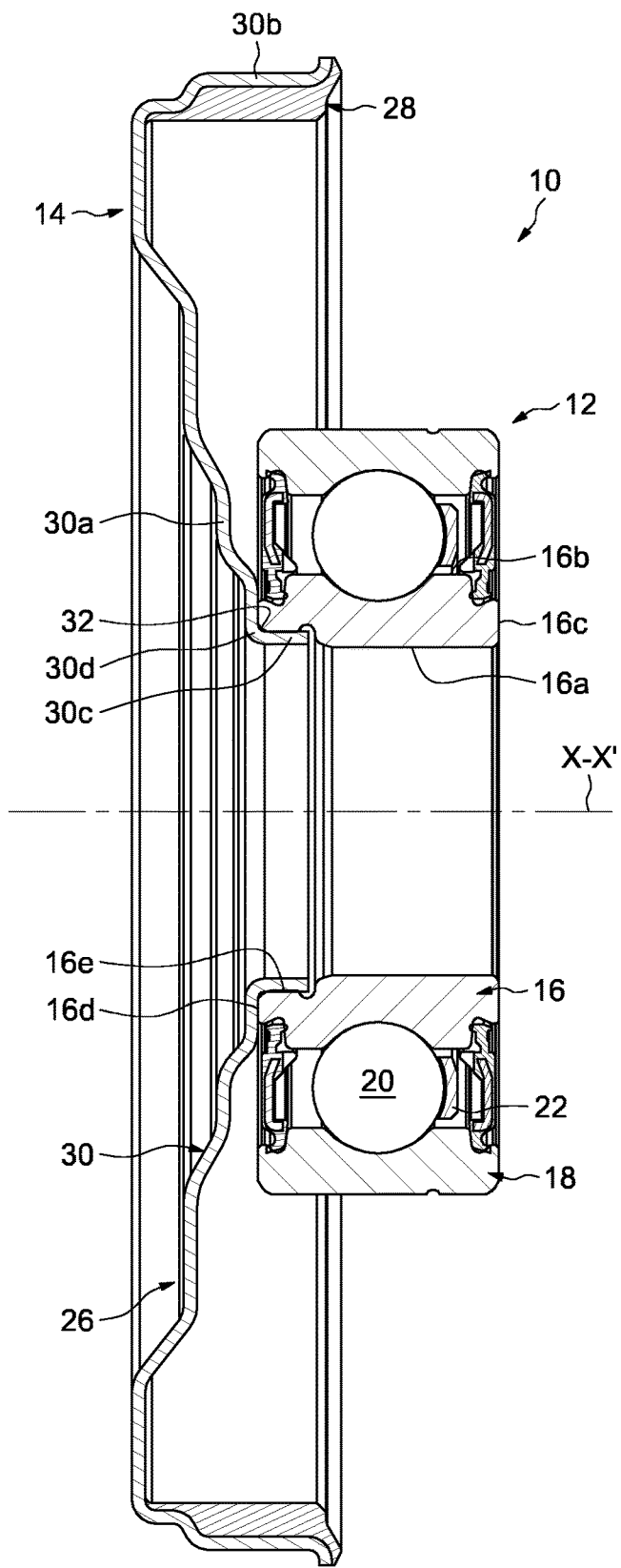
FIG. 1 is an axial section view of a sensor bearing unit according to a first example of the invention.

The sensor bearing unit 10 represented on FIG. 1 is adapted to equip an apparatus such as a motor, a brake system, a suspension system or any rotating machine, in particular for an automotive vehicle.

The sensor bearing unit 10 comprises a bearing 12 and an impulse ring 14 mounted on the bearing. The bearing 12 is intended to be mounted on a shaft (not shown) of the apparatus for tracking the rotation of the shaft.

The bearing 12 comprises a first ring 16 and a second ring 18. In the illustrated example, the first ring 16 is the inner ring whereas the second ring 18 is the outer ring. The inner and outer rings 16, 18 are concentric and extend axially along the bearing rotation axis X-X' which runs in an axial direction. The inner and outer rings 16, 18 are made of steel.

In the illustrated example, the bearing 12 also comprises a row of rolling elements 20, which are provided here in the form of balls, interposed between raceways (not referenced) formed on the inner and outer rings 16, 18. The rolling bearing 10 also comprises a cage 22 for maintaining the regular circumferential spacing of the rolling elements 20.

The inner ring 16 of the bearing is mounted on the outer surface of the shaft of the apparatus. The inner ring 16 is intended to rotate while the outer ring 18 is intended to be fixed. The outer ring 18 can be mounted in a fixed support member or housing, belonging to the apparatus.

The inner ring 16 comprises a cylindrical inner surface or bore 16a and an outer cylindrical surface 16b which is radially opposite to the bore 16a. A toroidal circular raceway for the rolling elements 20 is formed from the outer cylindrical surface 16b, the raceway being directed radially outwards.

The inner ring 16 also comprises two opposite radial lateral faces 16c, 16d which axially delimit the bore 16a and the outer surface 16b of the ring.

The inner ring 16 further comprises a cylindrical groove 16e made in the bore 16a. The groove 16e is centered on the axis X-X'. Diameter of bore 16a is smaller than diameter of groove 16e. The groove 16e opens on the radial lateral face 16d.

The impulse ring 14 is mounted on the inner ring 16. The impulse ring 14 comprises an annular target holder 26 and a target 28 mounted on the target holder. In this example, the target holder 26 only comprises a flange 30 onto which is mounted the target 28.

The flange 30 is axially secured to the inner ring 16 of the bearing. The flange 30 is mounted into the bore 16a of the inner ring of the bearing. The flange 30 is axially mounted against the lateral face 16d of the inner ring. In the disclosed example, the flange 30 is made in one part. The flange 30 is made of metal.

The flange 30 comprises an annular radial portion 30a, an outer annular axial portion 30b radially surrounding the bearing 12, and an inner axial portion 30c secured to the inner ring 16 and defining the bore of the flange.

The outer axial portion 30b is located radially above the outer ring 18 of the bearing. The outer axial portion 30b extends radially a large-diameter edge of the radial portion 30a.

The radial portion 30a of the flange extends between the outer and inner axial portions 30b, 30c. The axial portion 30c extends axially inwards the radial portion 30a. The axial portion 30c extends axially a small-diameter edge of the radial portion 30a. Here, the inner axial portion 30c extends purely axially. A curved linking portion 30d is provided between the radial portion 30a and the inner axial portion 30c. The curved linking portion 30d is connected directly to the radial portion 30a and to the inner axial portion 30c.

As will be described later, at least the internal surface 32 of the curved linking portion 30d is provided with a plurality of dimples (not shown). The internal surface 32 is formed by the internal radius of the curved linking portion 30d which faces the inner ring.

The radial portion 30a of the flange axially abuts against the radial lateral face 16d of the inner ring. The radial portion 30a substantially extends radially from the axial portion 30c. In the illustrated example, the radial portion 30a of the flange is provided with frustoconical parts inclined with respect to the axis X-X' towards the opposite direction of the bearing 12. Frustoconical parts prevent any interference between the flange 30 and the outer ring 18 of the bearing.

The flange 30 is axially secured to the inner ring 16 by means of the inner axial portion 30c. The inner axial portion 30c forms a fixing portion of the target holder. The axial portion 30c is mounted into the bore 16a of the inner ring of the bearing. The inner portion 30c is secured into the bore 16a. More precisely, the inner portion 30c is mounted and secured into the groove 16e of the bore. For example, the inner portion 30c of the flange may be secured into the bore 16a of the inner ring 16e, by axial press-fitting. Alternatively, the inner axial portion 30c of the target holder may be secured into the bore 16a by snapping, by gluing, by welding, by radial crimping or any other appropriate means.

The target 28 is mounted on the outer axial portion 30b of the flange. In the disclosed example, the target 28 is mounted into the bore of the outer axial portion 30b. Alternatively, the target 28 may be mounted on the outer surface of the outer axial portion 30b.

In an embodiment, the target 28 includes magnetic North and South alternated poles. The target 28 is multi-polarly magnetized in the circumferentially direction. The target 28 may be a plastic molded part. The target 28 may be overmoulded onto the flange 30. Alternatively, the target 28 may be separately formed and secured onto the flange 30 by any appropriate means, for example by bonding or by press-fitting. The target 28 may be formed of a rubber material with magnetic powder, or of a magnetic alloy or of a plasto-ferrite or of an elasto-ferrite.

Detection means (not shown) are associated with the target 28 for tracking the rotation of the impulse ring 14 and the inner ring 16 around the axis X-X'. The detection means are disposed to radially face the inner surface of the target 28. For example, the detection means may include Hall-effect sensors. The target 28 is a radial target. Alternatively, the target may be an axial target.

As an alternative, the target 28 and the detection means may use any other suitable technology instead of magnetic technology. For example, induction technology or optic technology may be implemented.

Figure 2:
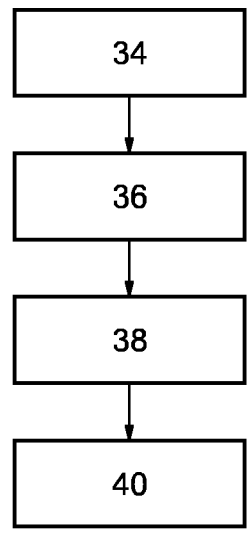
FIG. 2 shows the main steps of a method for manufacturing the flange of a target holder of an impulse ring of the sensor bearing unit of FIG. 1 according to an example of the invention.

FIG. 2 shows the main steps of a method for manufacturing the flange 30 of the target holder according to an example of the invention.

According to this example, the manufacturing method provides a preliminary manufacturing step 34 that provides a sheet of metal by cold rolling. This preliminary manufacturing step ends with a skin-pass operation. During this step, the roughness of the metal sheet is reduced. For example, the skin-pass operation is carried out in order to obtain a surface roughness value of the metal sheet ranging between 0.75 μm and 0.95 μm, and preferably between 0.8 μm and 0.9 μm. The surface roughness value $R_a$ is measured according to ISO 4287. The skin-pass operation is carried out on the complete metal sheet. The skin-pass operation is carried out by using polished rolling cylinders in the rolling mill. For example, the metal sheet may be AISI 1008 having a phosphating treatment and/or black oxide surface treatment.

After the manufacturing step 34 of the metal sheet, a forming step 36 is applied to this sheet in order to form the flange 30 (FIG. 1) of the target holder with the radial portion 30a, the axial portions 30b, 30c and the curved linking portion 30d. The forming step 36 may be achieved by drawing and cutting.

According to a first embodiment of the forming step 36, the bore of the flange is formed by cutting, before to fold the small-diameter part of the flange in order to form the inner axial portion 30c. Alternatively, according to a second embodiment of the forming step 36, the inner axial portion 30c may be firstly formed by drawing, and then the bore of the inner axial portion 30c is achieved. In this case, before to form the bore of the inner axial portion 30c, which also forms the bore of the flange, a radial front wall is formed at the end of the axial portion 30c on the side opposite to the radial portion 30a. With such second embodiment, less stresses are formed into the curved linking portion 30d of the flange.

Then, a shot peening step 38 is carried out on the internal surface 32 of the curved linking portion 30d of the flange. Due to the shot peening operation, a plurality of recesses or dimples are formed on the internal surface 32 of the curved linking portion 30d. These dimples cause the generation of compressive stresses in the material of the flange underlying the internal surface 32 of the curved linking portion 30d.

Accordingly, the layer beneath the internal surface 32 of the curved linking portion 30d is compressed, generating a compressively stressed layer underneath this shot peened internal surface. When the inner axial portion 30c of the flange is secured to the inner ring 16, this layer helps to prevent the stresses area to crack as a crack cannot propagate in a compressive environment.

For example, the dimples formed on the internal surface 32 of the curved linking portion 30d may have a depth ranging between 1 μm and 6 μm. For example, it is possible to provide a shot-hardness comprised between $H_RC50$ and $H_RC65$ (Rockwell hardness) and/or a shot-speed comprised between 60 m/sec and 150 m/sec.

The shot peeing parameters: shot material (material, grade, hardness, shape and size of shot), peeing parameters (shot velocity, masse-flow rate, peening time and impact angle) and intensity of the shot, may be chosen in order to obtain the predetermined desired maximum magnitude of compressive residual stress at the predetermined desired distance from the internal surface 32 of the curved linking portion 30d. For example, the depth from the internal surface 32 of the curved linking portion 30d subject to compressive stress may be comprised between 0.25 mm to 0.75 mm.

As previously mentioned, the internal surface 32 of the curved linking portion 30d is shot peened. Alternatively, the shot peening operation may be carried out both on the internal surface 32 and the external surface of the curved linking portion 30d of the flange. In another variant, the shot peening operation may be carried out on the whole the flange of the target holder.

In this example, the manufacturing method begins with the manufacturing step 34 of the metal sheet used for forming the flange. Alternatively, the manufacturing method may begin with the shot peening step 38, for example if the target holder is formed on a different production site that is remote from the site where the shot peening is carried out.

Then, after the shot peening step 38, a step of polishing and/or brushing 40 may be achieved on at least the internal surface 32 of the curved linking portion 30d of the flange. For example, the step of polishing and/or brushing is carried to obtain a roughness of the internal surface 32 ranging between 0.05 µm and 0.62 µm, and preferably between 0.07 µm and 0.6 µm. The surface roughness value $R_a$ is measured according to ISO 4287. In one embodiment, the step of polishing and/or brushing may be carried out on the whole flange 30 of the target holder.

The polishing step could be made by different processes and media including vibration and/or centrifugal rotation of the flange 30 into abrasive polishing materials, such as stone or metal. Alternatively, a chemical or electrolytic polishing could also be foreseen. Alternatively, or in combination to the polishing step, an abrasive brushing may also be provided.

After the manufacturing of the flange 30 target holder, the manufacturing of the sensor bearing unit 10 may be performed.

Figure 3:
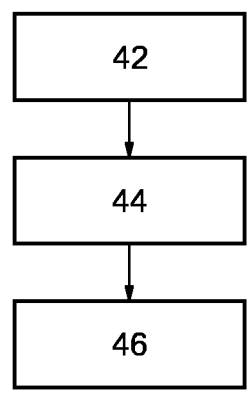
FIG. 3 shows the main steps of a method for manufacturing the sensor bearing unit of FIG. 1 according to an example of the invention.

FIG. 3 shows the main steps of a method for manufacturing the sensor bearing unit 10 according to an example of the invention.

According to this example, the manufacturing method provides an assembly step 42 of the components of the bearing 12, namely the inner and outer rings 16, 18, the rolling elements 20 and the cage 22. The groove 16e of the inner ring may be machined, for example by turning, after or before the assembly step 42.

After the assembly step 42, the flange 30 of the target holder is mounted on the inner ring 16 during a step 44. During this mounting step 44 of the target holder, the inner axial portion 30a of the flange is introduced into the groove 16e of the inner ring. Then, the target holder 30 is secured inside the groove 16e of the inner ring. The target 28 may be mounted on the flange 30 of the target holder before or after the mounting step 44 of the target holder on the inner ring.

In this example, the manufacturing method begins with the assembly step 42 of the components of the bearing 12. Alternatively, the manufacturing method may begin with the mounting step 44 of the flange 30 of the target holder on the inner ring 16, for example if the bearing 12 is assembled on a different production site that is remote from the site where the target holder 26 is mounted on the inner ring 16.

Figure 4:
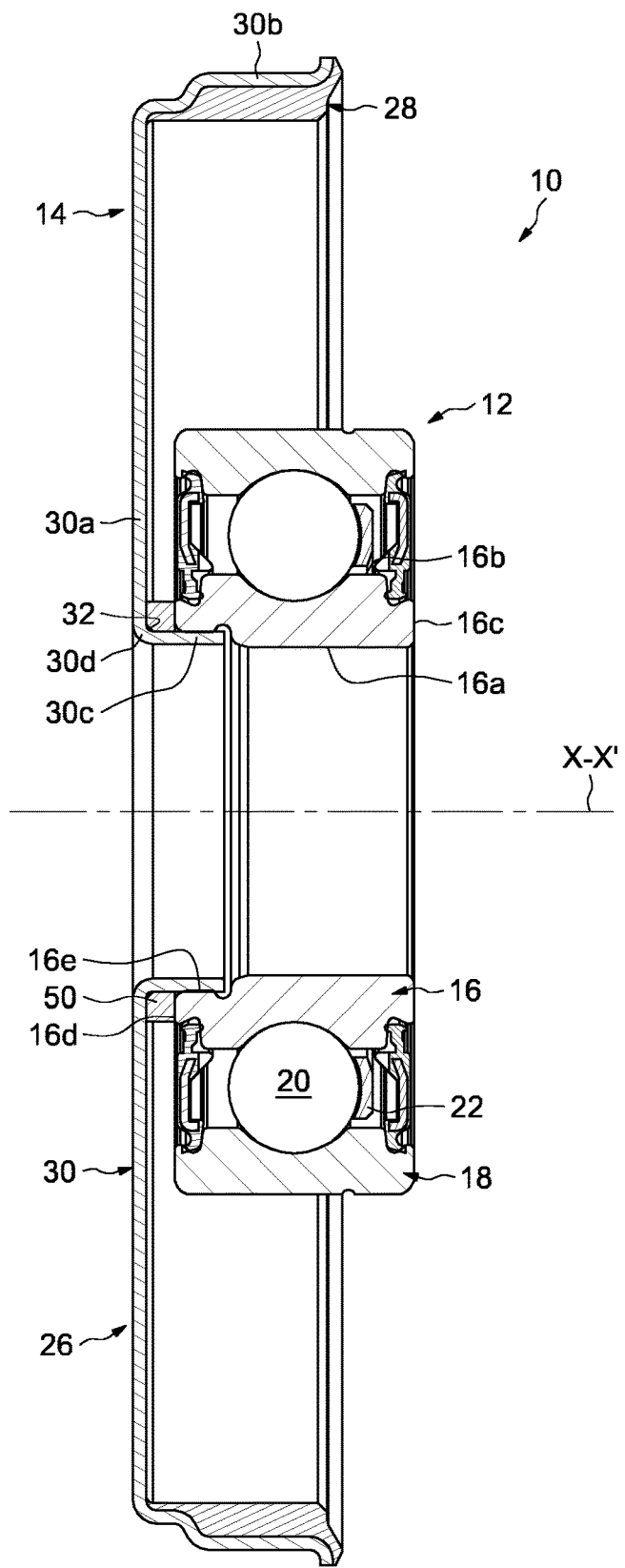
FIG. 4 is an axial section view of a sensor bearing unit according to a second example of the invention.

The second example shown on FIG. 4, in which identical part are given identical references, mainly differs from the first example in that the target holder 26 comprises the flange 30 onto which is mounted the target 28, and a washer 50 axially interposed between the radial portion 30a of the flange and the inner ring 16. The washer 50 is distinct from the flange 30.

The washer 50 is axially interposed between the radial portion 30a of the flange and the lateral face 16d of the inner ring. The washer 50 is in axial contact against the lateral face 16d of the inner ring on one side and in axial contact with the radial portion 30a of the flange on the other side. The washer 50 is mounted radially around the inner axial portion 30c of the flange.

The washer 50 is a spacer for axially shifting the flange 30 relative to the outer ring 16 of the bearing in order to avoid interferences therebetween. Accordingly, with regard to the first example, the radial portion 30a of the flange may have a simplified shape. In the illustrated example, the radial portion 30a of the flange extends purely radially.

Here, the method for manufacturing the flange 30 is identical to the one previously described for the first example. The method for manufacturing the sensor bearing unit 10 only differs from the previous method in that the washer 50 is mounted on the inner axial portion 30c of the flange before the mounting step 44 of the target holder on the inner ring.

Figure 5:
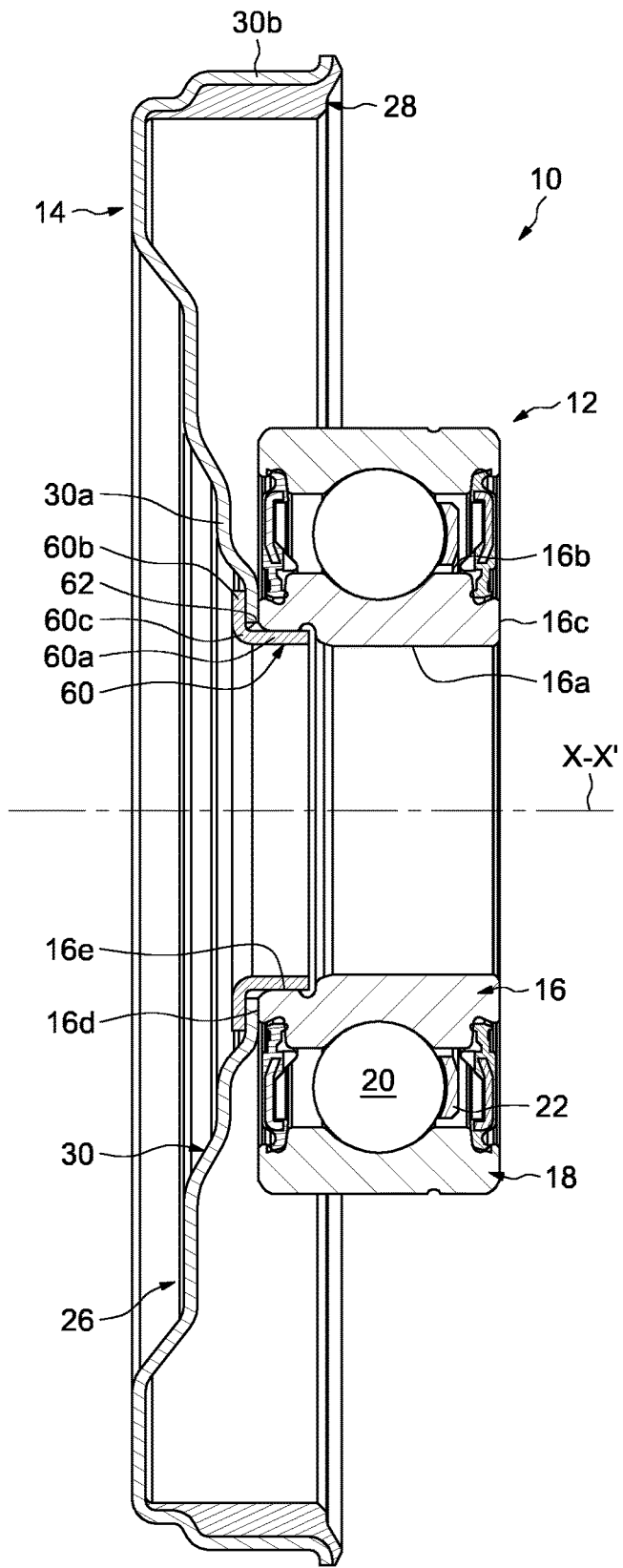
FIG. 5 is an axial section view of a sensor bearing unit according to a third example of the invention.

The third example shown on FIG. 5, in which identical part are given identical references, differs from the first example in that the target holder 26 comprises the flange 30 onto which is mounted the target 28, and a fixing sleeve 60 secured to the inner ring 16. In this example, the sleeve 60 forms a fixing portion of the target holder 26.

The flange 30 is axially secured to the inner ring 16 of the bearing by means of the sleeve 60. In this example, the flange 30 is deprived of the inner axial portion 30c and the curved linking portion 30d. The radial portion 30a defines the bore of the flange.

The flange 30 is axially mounted between the lateral face 16d of the inner ring and the sleeve 60. The flange 30 is mounted radially around the sleeve 60. The radial portion 30a of the flange is axially interposed and clamped between the lateral face 16d of the inner ring and the sleeve 60. The flange 30 is in axial contact against the lateral face 16d of the inner ring on one side and in axial contact with the sleeve 60 on the other side.

The sleeve 60 is axially secured to the inner ring 16. The sleeve 60 is mounted into the bore 16a of the inner ring of the bearing. The sleeve 60 is secured into the bore 16a. More precisely, the sleeve 60 is mounted and secured into the groove 16e of the bore. For example, the sleeve 60 may be secured into the bore 16a of the inner ring 16e, by axial press-fitting. Alternatively, the sleeve 60 may be secured into the bore 16a by snapping, by gluing, by welding, by radial crimping or any other appropriate means. In the disclosed example, the sleeve 60 is made in one part. The sleeve 60 is be made of metal.

The sleeve 60 comprises an annular axial portion 60a defining the bore of the sleeve, and an outer radial collar or portion 60b extending radially from the axial portion 60a. The radial portion 60b extends radially outwards from the axial portion 60a. The portion 60b extends an axial end of the axial portion 34a. A curved linking portion 60c is provided between the radial portion 60b and the axial portion 60a of the sleeve. The curved linking portion 60c is connected directly to the radial portion 60b and to the axial portion 60b.

As will be described later, at least the internal surface 62 of the curved linking portion 60c is provided with a plurality of dimples (not shown). The internal surface 62 is formed by the internal radius of the curved linking portion 60c which faces the inner ring.

The flange 30 is mounted radially around the axial portion 60a of the sleeve. The radial portion 30a of the flange is mounted radially around the axial portion 60a. An annular radial gap (not referenced) subsists between the bore of the flange 30 and the axial portion 60a of the sleeve. The axial portion 60a of the sleeve is secured to the inner ring 16 of the bearing. The axial portion 60a of the sleeve forms a fixing portion of the target holder. The axial portion 60a is mounted and secured into the bore 16a of the inner ring of the bearing. More precisely, the axial portion 60a of the sleeve is mounted and secured into the groove 16e of the bore.

The flange 30 is axially interposed and clamped between the lateral face 16d of the inner ring and the radial portion 60b of the sleeve. The radial portion 60b axially abuts against the radial portion 30a of the flange.

Figure 6:
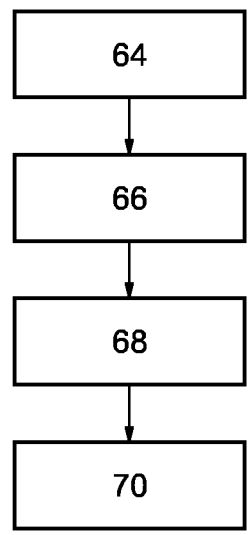
FIG. 6 shows the main steps of a method for manufacturing the sleeve of a target holder of an impulse ring of the sensor bearing unit of FIG. 5 according to an example of the invention.

FIG. 6 shows the main steps of a method for manufacturing the sleeve 60 of the target holder according to an example of the invention. This method is similar to the method for manufacturing the flange 30 of the target holder as described in the first example.

As a matter of fact, the method also comprises the preliminary manufacturing step 64 as previously described.

Then, the forming step 66 is applied to the metal sheet in order to form the sleeve 60 of the target holder with the axial portion 60a, the radial portion 60b and the curved linking portion 60c.

Then, the shot peening step 68 is carried out at least on the internal surface 62 of the curved linking portion 60c of the sleeve. Due to the shot peening operation, a plurality of recesses or dimples are formed. In this example, the manufacturing method begins with the manufacturing step 64 of the metal sheet used for forming the sleeve. Alternatively, the manufacturing method may begin with the shot peening step 68.

Then, after the shot peening step 68, the step of polishing and/or brushing 70 may be achieved on at least the internal surface 62 of the curved linking portion 60c of the sleeve.

In this example, the manufacturing of the flange 30 of the target holder may be achieved in a conventional way for example by drawing and cutting.

After the manufacturing of the flange 30, the manufacturing of the sensor bearing unit 10 may be performed. After the mounting of the target holder 30 on the sleeve 60, the manufacturing of the sensor bearing unit may be done as previously described for the first example.

In the illustrated examples, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

Otherwise, as previously mentioned, in these illustrated examples, the first ring of the rolling bearing is the inner ring whereas the second ring is the outer ring. As an alternative, it could be possible to provide a reversed arrangement with the first ring forming the outer ring and the second ring forming the inner ring. In this case, the target holder is secured to the outer ring.

The invention claimed is:

1. A method for manufacturing a target holder for a sensor bearing unit, the target holder comprising:
   at least an axial fixing portion secured to a ring of the sensor bearing unit, and a radial portion extending at least radially with respect to the axial fixing portion,
   a curved linking portion being formed between the axial fixing portion and the radial portion, and further comprising
   a step of shot peening at least on the internal surface of the curved linking portion of the target holder.

2. The method according to claim 1, wherein the step of shot peening is carried out on the complete target holder.

3. The method according to claim 1, further comprising a step of polishing and/or brushing at least the internal surface of the curved linking portion of the target holder.

4. The method according to claim 3, wherein the step of polishing and/or brushing is carried out after the step of shot peening.

5. The method according to claim 1, further comprising, before the step of shot peening, a step of forming the target holder from a metal sheet by drawing.

6. The method according to claim 5, further comprising, before the step of forming the target holder, a step of manufacturing the metal sheet including a final skin-pass operation.

7. Method for manufacturing a sensor bearing unit comprising:
   providing a bearing comprising a first ring and a second ring capable of rotating concentrically relative to one another, and an impulse ring provided with a target holder secured to the first ring and with a target mounted on the target holder, comprises the following steps:
   manufacturing the target holder according to claim 1, and securing the target holder to the first ring.

8. A sensor bearing unit comprising:
   a bearing comprising a first ring and a second ring centered on an axis, and
   an impulse ring provided with a target holder and with a target mounted on the target holder, the target holder comprising at least an axial fixing portion secured to the first ring, and a radial portion extending at least radially with respect to the axial fixing portion, a curved linking portion being formed between the axial fixing portion and the radial portion of the target holder, wherein
   at least the internal surface of the curved linking portion of the target holder is provided with a plurality of dimples.

9. The sensor bearing unit according to claim 8, wherein the target holder of the impulse ring comprises at least a flange onto which is mounted the target, the flange comprising an axial portion forming the axial fixing portion of the target holder.

10. The sensor bearing unit according to claim 8, wherein the target holder of the impulse ring comprises at least a flange onto which is mounted the target and a sleeve, the sleeve comprising an axial portion forming the axial fixing portion of the target holder, the flange being axially mounted between a lateral face of the inner ring and the sleeve and being radially mounted around the sleeve.

* * * * *